Patented Dec. 11, 1945

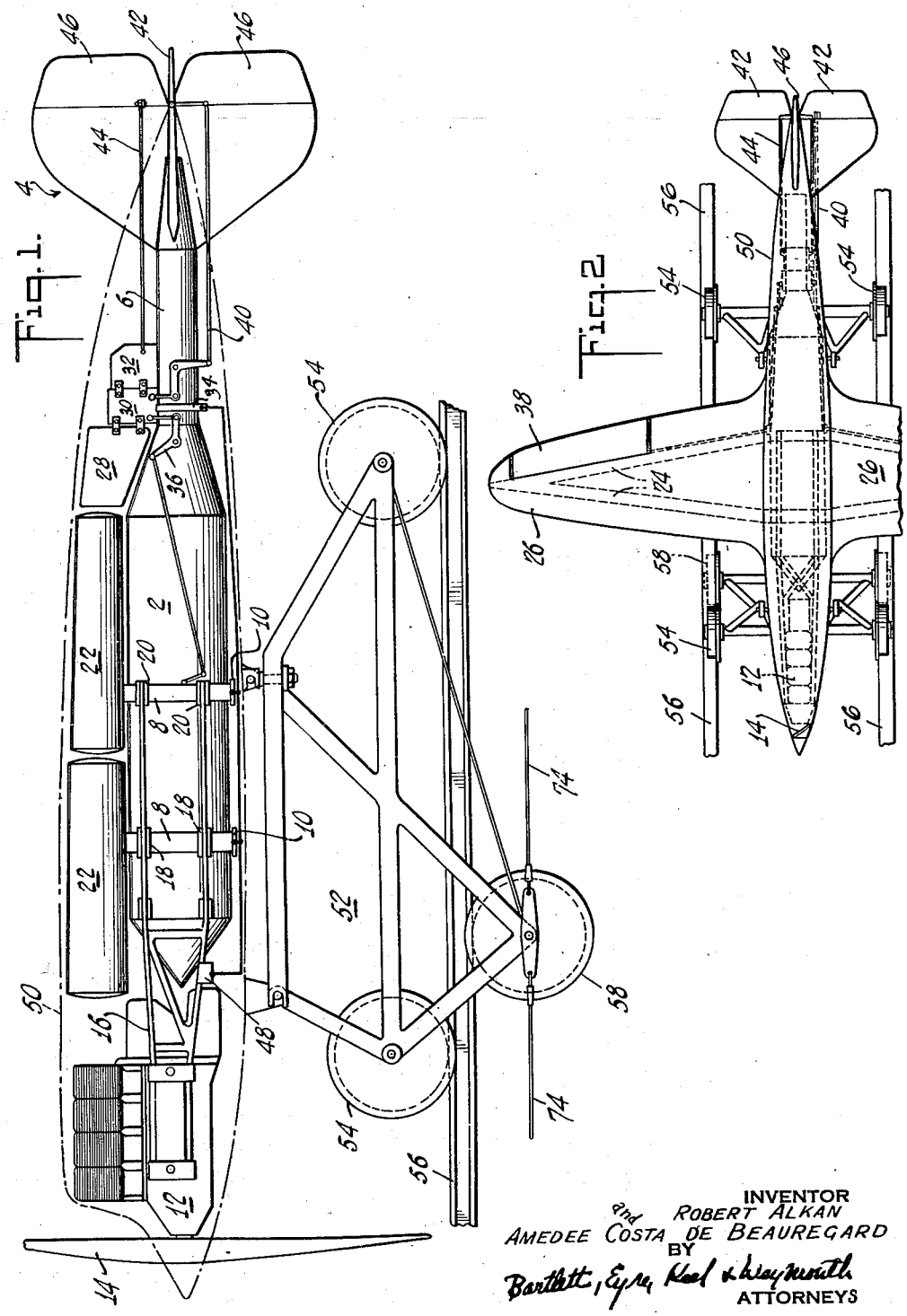

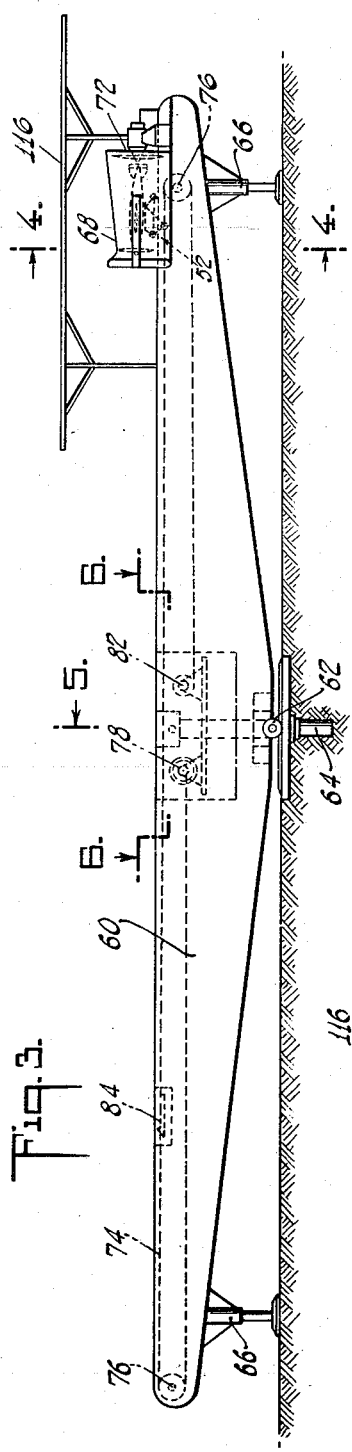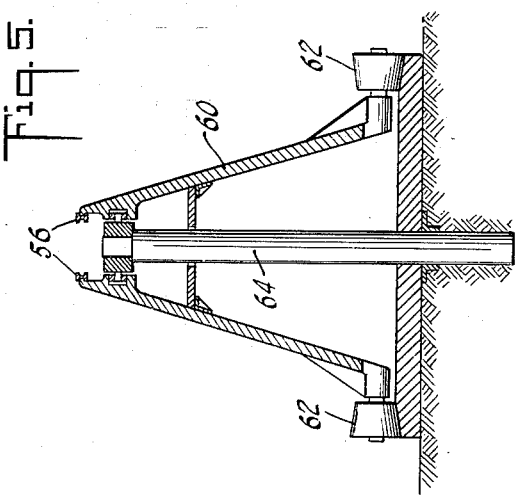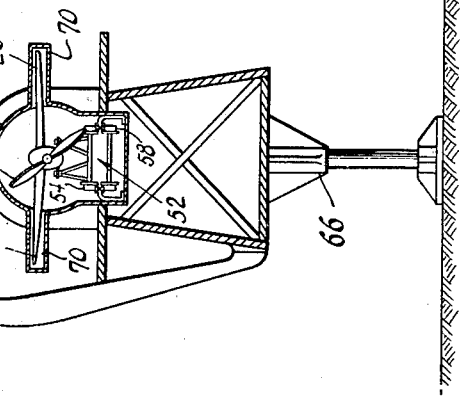

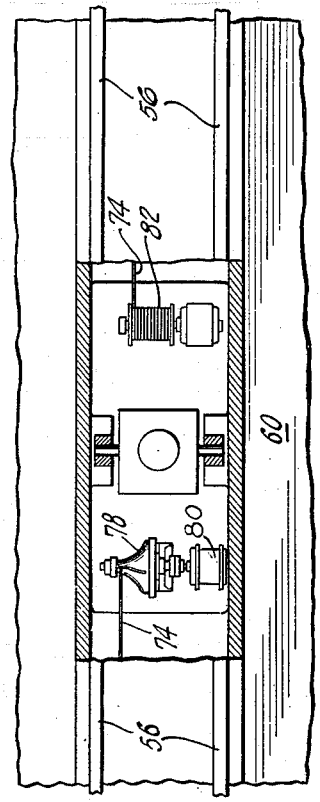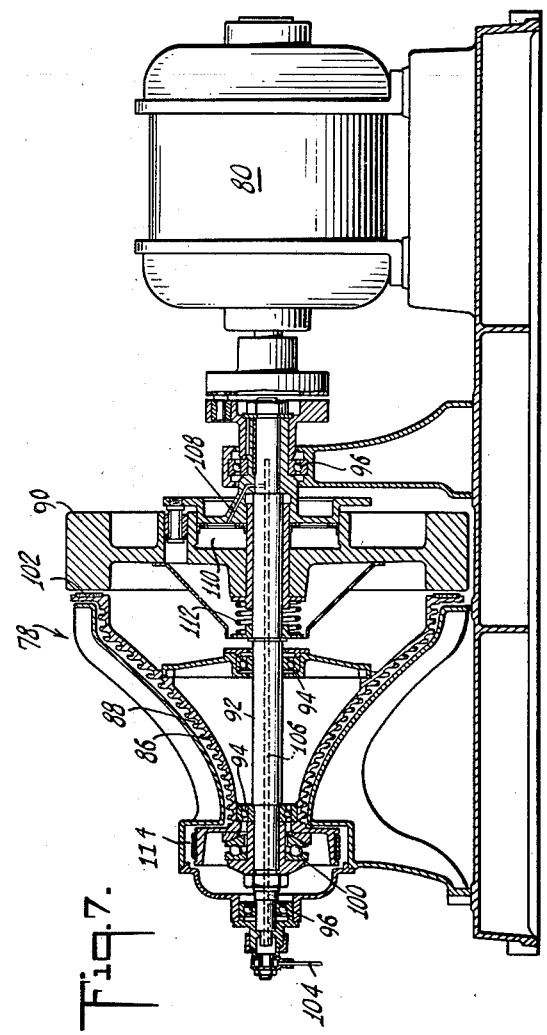

2,390,677

UNITED STATES PATENT OFFICE 2,390,677

CATAPULT DEVICE FOR AUTONOMOUS AERIAL TORPEDOES

Robert Alkan and Amedee Costa de Beauregard, New York, N. Y.

Application May 21, 1942, Serial No. 443,864

1 Claim. (Cl. 244—63)

The present invention relates to aerial torpedoes and more particularly to autonomous self-propelling aerial torpedoes, and comprises novel means for initiation of the flight of the torpedo.

An object of the invention is to provide a catapult device which will give sufficient starting speed for the take-off of a torpedo-plane having a fixed pitch propeller.

Autonomous self-propelling aerial torpedoes have not heretofore been used in warfare partly because of their high cost and partly because they have not been so constructed as to make them entirely reliable in operation. Their tremendous advantage over aircraft in the bombing of distant targets in enemy held territory, due to the fact that human pilots are not required, is readily apparent. In addition, there are many other advantages which these aerial torpedoes have over aircraft. For example, their size is so small that they present but a small target to anti-aircraft fire. As their trip is only one way, they require but half as much fuel per unit of weight as an airplane. Also, as compared with bombers, they require no fighter planes for protection, no large ground personnel, and no home landing field.

There are certain definite requirements which should be met for a really efficient autonomous aerial torpedo. First, the weight, over and above that of the torpedo itself, should be kept to a minimum in order that the range of flight be as great as possible. Second, they should be so made that the descent of the torpedo at the end of the flight should not be impeded by the propelling or directing elements of the structure, and, third, efficient means for initiating the flight should be provided. Also, of course, the cost should not be prohibitive but should be kept as low as possible consistent with reliable performance.

The aerial torpedo and catapult therefor of the present invention meets all of these requirements.

Features of the catapulting device of the invention are a wind tunnel for speeding up the rotation of the torpedo's propeller, and an accelerating towing means for initiating the flight, thus permitting the use of a fixed pitch propeller on the torpedo-plane. This catapult arrangement thus not only makes unnecessary the relatively expensive variable pitch propeller but also eliminates the expense and added complication and weight of control means therefor.

For a better understanding of the invention, reference may be had to the accompanying drawings, of which—

Fig. 1 is a side view of a torpedo-plane suitable for use with the catapult device of the invention and mounted on the trolley of the catapult;

Fig. 2 is a plan view, on a reduced scale, of the torpedo-plane of Fig. 1;

Fig. 3 is a diagrammatic side view of the catapult;

Fig. 4 is an enlarged vertical section taken on the line 4—4 of Fig. 3 showing the torpedo-plane within the wind tunnel;

Fig. 5 is an enlarged vertical section through the center of the catapult;

Fig. 6 is an enlarged horizontal sectional view taken along the line 6—6 of Fig. 3 and broken away to show the driving and rewind mechanism for the towing cable; and Fig. 7 is an enlarged view of the driving mechanism of the catapult showing the winch in vertical section.

As shown best in Figs. 1 and 2, the torpedo-plane comprises the torpedo or bomb 2 which forms the body of the plane and to which all the other parts are releasably secured, with the exception of the tail structure 4 which is carried on an elongated tube 6 integral with the torpedo 2. A pair of steel straps 8 are secured around the bomb's body with the meeting ends of each fastened together with a fusible link 10. The engine 12 carrying the fixed pitch propeller 14 is mounted on engine tubes 16 and these tubes are secured to the straps 8 at the points 18 and 20 in any suitable manner, as for example by welding. The gas tanks 22 are also secured to the straps 8 as are the struts 24 for the wings 26. Between the rear tank 22 and the tail structure 4 are the radio receiver 28 and the auto-pilots 30 and 32. The receiver 28 and auto-pilot 32 are secured to the auto-pilot 30 which in turn is secured to the tube 6 by a separate steel strap 34 provided with a fusible link similar to the links for straps 8. Auto-pilot 30, through linkage 36 controls the ailerons 38 and through linkage 40 controls the elevators 42. Auto-pilot 32, through linkage 44, controls the rudders 46. The auto-pilots 30 and 32 may be of the type disclosed and claimed in Alkan Patents Nos. 2,259,600 and 2,204,290, but any other known type may be employed. As the torpedo-plane is small and has such a short useful life, relatively inferior materials may be used in the construction of these devices.

With the above described structure, the breaking of the links of belts 8 and 34 at a predetermined time in the flight of the torpedo-plane releases the bomb 2 with its tail structure 4 from the rest of the plane and permits the bomb to fall separately therefrom toward its target. Any suitable arrangement for opening the links of the straps may be employed. For example, an electric current, initiated by the radio receiver upon the receipt of a releasing signal could be employed for firing the fuse links, or a timing device or revolution counter could be employed for this purpose. In Fig. 1 the unit 48, mounted on the engine tubes 16 and wired to the links of the belts 8 and 34 is intended to illustrate diagrammatically any suitable timing device for controlling the release of the bomb.

Upon the release of the bomb, the engine will continue to rotate for an instant and its traction, maintained in the same trajectory by the gyroscopic effect of the propeller, will insure separation of the plane debris from the bomb, with the result that the bomb with its tail unit will fall directly toward its target without becoming entangled or its speed hampered, by the plane structure.

The above-described torpedo-plane can be made of relatively inexpensive light material. The wings, for example, could be of plastic wood and the fixed pitch propeller of wood. Preferably the whole structure is streamlined with a separate skin 50 of light metal. No landing gear, of course, is necessary.

The torpedo-plane before take-off is supported on a suitable trolley 52 as shown in the drawings. The trolley 52 as shown best in Figs. 1 and 2 comprises an open framework having two pairs of wheels 54, riding on the upper surface of a pair of double rails 56, and one pair of wheels 58, engaging the under surface of the rails 56.

The catapult for the take-off of the torpedo-plane and of which the rails 56 form the runway is shown diagrammatically in Figs. 3 to 6, to which reference may now be had. As shown, the catapult comprises an elongated framework 60 which is carried near its center of gravity by a pair of rollers 62 so as to be rotatable about a central post 64 for azimuth adjustment. A pair of hydraulic jacks 66 are provided at either end for adjustment of the inclination of the track. In accordance with the invention a wind tunnel 68 is located at one end of the runway formed by the track 56. The tunnel is of a size to accommodate the torpedo-plane on its trolley with the propeller 14 of the plane in the smallest portion of the tunnel. The side walls of tunnel 68 are formed, as shown, with outwardly extending portions enclosing the shallow chambers 70 for accommodation of the wings 26 of the plane. A fan 72 at the end of the tunnel 68 in the rear of the plane draws a strong current of air past the propeller 14 while the engine is getting up speed. This air current, by reducing the resisting torque of the propeller, boosts the engine's speed and facilitates the subsequent take-off.

For moving the trolley 52 on the track during the take-off and for returning the trolley after the take-off, there is provided a cable 74, which is secured to the lower axle of the trolley (see Fig. 1) and passes over pulleys 76 at opposite ends of the catapult. The forward end of the cable 76 is secured to a winch 78 mounted adjacent the central post of the catapult, which winch is driven by a motor 80 and provides the forward motion for the trolley during the take-off. The other end of the cable may be secured to any suitable reel, such as that indicated at 82, for returning the trolley after take-off of the plane.

The main purpose of the tunnel 68 and the fan 72 is to insure sufficient engine speed for the take-off of the torpedo-plane with the fixed pitch propeller. The tunnel 68 is also useful, however, for testing of the plane during conditions similar to flight, and such tests may often be necessary to insure proper operation of the plane in flight. By the use of the tunnel the propeller may be brought up to full speed prior to start of the take-off. During movement of the plane and trolley along the runway, the decrease in propeller speed, due to the relatively short distance of run, will not be excessive, so that upon release of the plane, it will take off under its own power. As a further assurance of take-off, the winch 78 is constructed, according to the invention, to cause a relatively rapid acceleration of the trolley and plane during travel from the tunnel to the point of release. As the means for releasing the plane from the trolley can be effected by any one of the conventional means now in use in catapulting airplanes from carriers or the like, and as it forms no part of the present invention, no specific releasing means have been illustrated. The hook or latch 84 shown in Fig. 3 is intended to indicate diagrammatically the point of release of the plane and the start of the braking run of the trolley.

The winch 78, which gives the accelerated forward movement to the trolley is shown in section in Fig. 7. This winch comprises a winding drum 86 having cable grooves 88 of increasing diameter and an inertia fly-wheel 90 which is frictionally clutched to the drum 86 during take-off. Flywheel 90 is slidably mounted on, and keyed to, a shaft 92, whereas drum 86 is freely mounted on bearings 94 on this shaft. The shaft revolves in bearings 96 and is driven by motor 80. A thrust bearing 100 is provided for the small end of the winding drum 86, whereas the other end of the drum is faced with a friction ring 102 for engagement with the face of inertia wheel 90 when the wheel and drum are to be clutched together. Movement of flywheel 90 along the shaft to clutch the drum and flywheel is effected by oil pressure delivered through a pipe 104 to a longitudinal passage 106 within the shaft 92, which passage communicates through a passage 108 with an annular pressure chamber 110 in the flywheel 90. A counter spring 112 is provided for separating the drum and flywheel upon release of the oil pressure. A brake for the drum 86, after release of the plane, is provided at 114.

In operation of the above described device, the flywheel 90 is first brought up to speed by the motor 80, then, after the propeller 14 of the torpedo plane has been brought up to speed by the plane's engine, oil is supplied through pipe 104 to cause clutching of the drum 86 to the flywheel and consequent immediate rapid rotation of the drum, due to the kinetic energy stored in the flywheel and added to the driving energy of the motor.

The trolley and plane will thus be drawn rapidly along the rails 56 and at an accelerating speed due to the increasing diameter of the cable grooves 88. At the moment of release the torpedo plane will take off and thereafter gain altitude and speed under its own power.

After release of the plane the drum and flywheel are declutched, the drum braked and the trolley returned by reel 82 ready for reception of the next torpedo-plane which is delivered to it by any suitable means, as for example, the overhead hoist indicated diagrammatically at 116.

The invention has now been described in connection with one particular embodiment thereof. Obviously various changes might be made in the construction described and various features might be employed without the corresponding use of other features without departing from the spirit of the invention as defined in the appended claim.

We claim:

A catapult device for an autonomous aerial torpedo equipped with an engine, with wings and with a fixed pitch propeller comprising in combination a substantially horizontal runway, a trolley movable along the runway and adapted to carry the aerial torpedo, a tunnel at the rear end of the runway for housing the torpedo and trolley prior to take-off, said tunnel being formed with a central longitudinal chamber the smallest cross-sectional area of which is substantially coincident with the propeller circle and with a pair of shallow chambers extending laterally from the central chamber for accommodation of the propeller wings, means for creating a localized air stream through said tunnel from front to rear thereof to boost the engine speed when the torpedo is positioned in the tunnel with its propeller substantially in the plane of said smallest cross-sectional area of the central chamber and means for towing said trolley along the runway from the tunnel at a speed sufficient for take-off of the aerial torpedo from the trolley.

ROBERT ALKAN.
AMEDEE COSTA DE BEAUREGARD.